United States Patent
Arai et al.

(10) Patent No.: US 10,486,844 B2
(45) Date of Patent: Nov. 26, 2019

(54) HEAT-SEALING DEVICE AND FILLING-PACKING MACHINE PROVIDED THEREWITH

(71) Applicant: TAISEI LAMICK CO., LTD., Saitama (JP)

(72) Inventors: Koichi Arai, Saitama (JP); Mitsuhiro Sato, Satiama (JP)

(73) Assignee: TAISEI LAMICK CO., LTD., Saitama (JP)

( * ) Notice: Subject to any disclaimer, the term of this patent is extended or adjusted under 35 U.S.C. 154(b) by 396 days.

(21) Appl. No.: 15/317,618

(22) PCT Filed: Jun. 17, 2015

(86) PCT No.: PCT/JP2015/067466
§ 371 (c)(1),
(2) Date: Dec. 9, 2016

(87) PCT Pub. No.: WO2016/002519
PCT Pub. Date: Jan. 7, 2016

(65) Prior Publication Data
US 2017/0129633 A1 May 11, 2017

(30) Foreign Application Priority Data
Jul. 4, 2014 (JP) .................. 2014-138875

(51) Int. Cl.
*B65B 51/30* (2006.01)
*B65B 57/00* (2006.01)
(Continued)

(52) U.S. Cl.
CPC ............... *B65B 51/30* (2013.01); *B65B 9/20* (2013.01); *B65B 51/02* (2013.01); *B65B 57/00* (2013.01); *B65B 61/06* (2013.01)

(58) Field of Classification Search
CPC ......... B65B 61/06; B65B 41/16; B29C 65/18; B29C 66/0326; B29C 66/1122;
(Continued)

(56) References Cited

U.S. PATENT DOCUMENTS

| 4,018,029 | A * | 4/1977 | Safranski | .................. B65B 1/32 |
| | | | | 53/502 |
| 6,568,157 | B1 * | 5/2003 | Futase | ....................... B65B 3/10 |
| | | | | 141/105 |
| 6,725,625 | B1 * | 4/2004 | Honma | .................. B29C 65/02 |
| | | | | 53/64 |

FOREIGN PATENT DOCUMENTS

JP 4-114841 4/1992
JP 8-151005 6/1996
(Continued)

OTHER PUBLICATIONS

Search Report issued in Patent Application No. PCT/JP2015/067466, dated Sep. 1, 2015.
(Continued)

*Primary Examiner* — Michelle Lopez
*Assistant Examiner* — Chinyere J Rushing-Tucker
(74) *Attorney, Agent, or Firm* — Greenblum & Bernstein, P.L.C.

(57) ABSTRACT

A heat-sealing device is capable of properly changing a pushing force applied from the heat-sealing roll to the packing film in accordance with the feeding rate of the packing film. A heat-sealing device for holding an elongated packing film with a pair of heat sealing rolls arranged in parallel to each other to form a heat sealed portion includes a pushing means made of a first cylinder and a second cylinder for holding the packing film with the heat-sealing rolls by pushing through an action of fluid pressure, a fluid pressure controlling means capable of adjusting the fluid pressure of the pushing means, and a superior controlling
(Continued)

means for rendering a total value of pushing forces of the first cylinder and second cylinder into a proper pushing force and operating one or both of the first cylinder and the second cylinder in accordance with the feeding rate of the packing film.

4 Claims, 6 Drawing Sheets

(51) Int. Cl.
  *B65B 9/20* (2012.01)
  *B65B 51/02* (2006.01)
  *B65B 61/06* (2006.01)

(58) Field of Classification Search
  CPC .............. B29C 66/4312; B29C 66/723; B29C 66/73921; B29C 66/81465; B29C 66/8242; B29C 66/8322; B29C 66/83513; B29C 66/849; B29C 66/872; B29C 66/91645; B29C 66/9241; B29C 66/934
  See application file for complete search history.

(56) References Cited

FOREIGN PATENT DOCUMENTS

| | | | |
|---|---|---|---|
| JP | 11-236002 | | 8/1999 |
| JP | 2001-97321 | | 4/2001 |
| JP | 2003-291928 | | 10/2003 |
| JP | 2003291928 A | * | 10/2003 |
| JP | 2005-22659 | | 1/2005 |
| JP | 2010-13171 | | 1/2010 |
| JP | 2013-86833 | | 5/2013 |

OTHER PUBLICATIONS

International Preliminary Report on Patentability in Patent Application No. PCT/JP2015/067466, dated Jan. 10, 2017.
Office Action issued in Republic of Korea Counterpart Patent Appl. No. 10-2017-7001090, dated Apr. 6, 2018.

* cited by examiner

HEAT-SEALING DEVICE AND FILLING-PACKING MACHINE PROVIDED THEREWITH

TECHNICAL FIELD

This invention relates to a heat-sealing device and a filling-packing machine provided therewith. More particularly, the invention proposes a heat-sealing device and a filling-packing machine provided therewith capable of always performing sure filling-packing of a material to be packed by simply monitoring and controlling heat-sealing conditions and filling conditions in accordance with a running rate of a packing film.

RELATED ART

In late years, it is generally and widely performed to automatically fill and pack a liquid material, a viscous material, powder, granulates or other material to be packed such as food and drink, seasonings, medicines, cosmetics and the like with a flexible packing film.

For example, as described in Patent Document 1, an automatic filling-packing machine for the material to be packed is known as follows. A packing film of a lamination structure comprised of a uniaxially or biaxially oriented base film layer and a non-oriented sealant layer, or a packing film of a single layer structure made by partly coating the base film layer with a heat-sensitive adhesive layer is folded in half-breadth so as to face the sealant layer or the heat-sensitive adhesive layer inward, and free end portions of the folded film are overlapped with each other and welded by heating and pressurizing with a pair of vertical sealing rolls and transmitted downward to form a vertical sealing portion extending in the longitudinal direction, whereby the packing film is shaped into a cylindrical form.

Then, the cylindrically shaved film is transmitted downward while being welded by sequentially heating and pressurizing with a plurality of heat-sealing bars located at even intervals in a circumferential direction around a pair of lateral sealing rolls in a lateral sealing device, whereby lateral sealing portions extending in the widthwise direction of the cylindrical packing film are formed intermittently at intervals in the longitudinal direction of the packing film to prepare package bags. At this time, a material to be packed is filled in each of the package bags by continuously feeding into the inside of the packing film or intermittently feeding between the formation of one lateral sealing portion to the formation of subsequent lateral sealing portion in the cylindrically formed packing film and then cutting a middle part of the lateral sealing portion in the continuously manufactured package bags with a cutting mechanism, whereby one bag or plural bags at a continuous state are sequentially taken out from the machine.

In this case, the lateral sealing device further comprises a support mechanism of horizontally arranging the pair of lateral sealing rolls and supporting them so as to approach or separate from each other in parallel, a drive mechanism of rotating lateral sealing rolls in a direction opposing to each other at an equal rate, and a biasing mechanism of biasing one of the lateral sealing rolls to the other. The biasing mechanism comprises an air cylinder of pushing a bearing portion for supporting both end parts of a support shaft of the lateral sealing roll in a direction of approaching to a bearing portion for supporting both end parts of a support shaft of the other lateral sealing roll.

PRIOR ART DOCUMENT

Patent Document

Patent Document 1: JP-A-H04-114841

SUMMARY OF THE INVENTION

Task To Be Solved by the Invention

In the conventional lateral sealing device, one of the lateral sealing rolls is pushed toward the other lateral sealing roll with the one air cylinder as mentioned above.

Therefore, such a lateral sealing device has a problem that fine adjustment in a low-speed operation (pushing under low pressure) is difficult due to inertial of a piston or resistance force of the operation and heat sealing cannot be performed stably.

Recently, high-speed operation of the automatic filling-packing machine is promoted for increasing the productivity. In the conventional lateral sealing device, however, since the low-speed operation cannot be performed stably as mentioned above, the packing film is fed at high-speed even when, for example, longitudinal misalignment of the packing film or an amount of the packing material filled is adjusted at a start of operating the filling-packing machine or an examination of judging right and wrong of a product is performed, and there is a problem of voluminous loss of the film material or the packing material.

It is, therefore, an object of the invention to provide a heat-sealing device capable of properly changing a pushing force applied from the heat-sealing roll to the packing film in accordance with the feeding rate of the packing film, particularly performing the heat sealing always surely even in the low-speed operation as well as a filling-packing machine provided therewith.

Solution for Task

In order to solve the above task, the invention proposes a heat-sealing device for holding an elongated packing film fed in a longitudinal direction and arranged at an opposing state of adhesive layers or sealant layers with a pair of heat-sealing rolls disposed in parallel to each other to form a heat-sealed portion, characterized by comprising a pushing means made of a first cylinder and a second cylinder arranged on the same axial line for holding the packing film with the heat-sealing rolls by pushing at least one of the heat-sealing rolls to the other heat-sealing roll through an action of fluid pressure, a fluid pressure controlling means capable of adjusting the fluid pressure of the pushing means, and a superior controlling means for calculating a proper pushing force from input values of a variety of the packing film and filling condition and controlling the fluid pressure controlling means so that a total value of pushing forces of the first cylinder and second cylinder is made equal to the calculated proper pushing force and one or both of the first cylinder and the second cylinder are operated in response to a change in the feeding rate of the packing film.

In the heat-sealing device according to the invention, it is a more preferable that the superior controlling means operate only the first cylinder when the feeding rate of the packing film is not more than a predetermined rate and controls the fluid pressure controlling means so as to offset a shortage of the pushing force of the first cylinder with the pushing force of the second cylinder when the feeding rate of the packing film exceeds the predetermined rate.

Also, the invention proposes a filling-packing machine comprising a vertical sealing means for forming a vertical sealed portion continuously extended in a longitudinal direction of one or two elongated packing films at a side edge portion of the packing film intermittently or continuously fed in the longitudinal direction and arranged at an opposing state of adhesive layers or sealant layers to render the packing film into a cylindrical form, and a lateral sealing means for forming lateral sealed portions, which are extended in a direction perpendicular to the longitudinal direction of the packing film over a full width of the packing film for sealing a packing material intermittently or continuously filled in the cylindrical packing film provided with the vertical sealed portion, at intervals in the longitudinal direction of the packing film, characterized in that the vertical sealing means and/or the lateral sealing means are provided with the aforementioned heat-sealing device.

Effect of the Invention

In the heat-sealing device and the filling-packing machine provided therewith according to the invention, the pushing means for pushing a pair of bearing portions for the sealing rolls, which are arranged in parallel and rotating in opposite directions to each other for heat sealing, in a direction approaching to each other is constructed with the first cylinder and the second cylinder, in which a total value of pushing forces of the two cylinders is made to a proper pushing force calculated in accordance with a variety of the packing film such as packaging form, film construction and so on and the filling conditions such as feeding rate of the film and so on.

Thus, an acceptable range in a change of the pushing force by the pushing means is increased. For example, the each pushing force of the first cylinder and the second cylinder is adjusted followed by the operating speed even if the feeding rate of the packing film is made low for adjusting misalignment of the packing film or the amount of the packing material filled or even if the operation is performed at a high speed for increasing the productivity, so that the sure heat sealing can be performed consistently.

According to the invention, non-defective products can be manufactured from the start of production to the end thereof, so that voluminous loss of the packing film or the packing material is not caused.

BRIEF DESCRIPTION OF THE DRAWINGS

FIGS. 2(*a*) and 2(*b*) are a plan view and a front view illustrating a construction of the lateral sealed portion forming part in the above example.

FIGS. 6(*a*) and 6(*b*) are schematic views illustrating an operating state of the lateral sealed portion forming part in the above example.

EMBODIMENTS FOR CARRYING OUT THE INVENTION

An embodiment of the invention will be described with reference to the accompanying drawings below.

Figure 1:
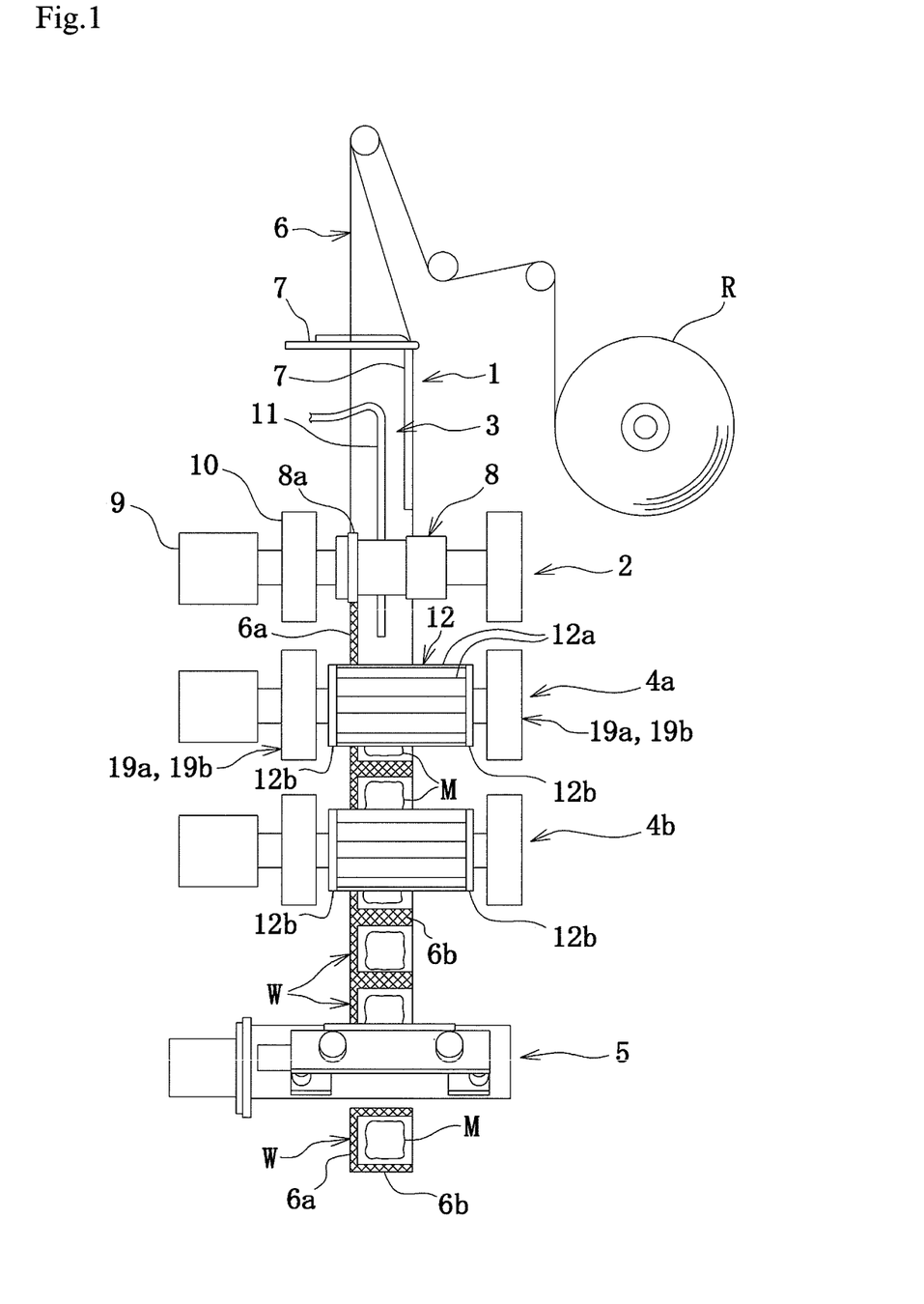
FIG. 1 is a schematic view illustrating a construction of a vertical type filling-packing machine as an example of the filling-packing machine according to the invention provided with a lateral sealed portion forming part as an example of the heat-sealing device according to the invention.

FIG. 1 is a schematic view illustrating a construction of a vertical type filling-packing machine as an example of the filling-packing machine provided with a lateral sealed portion forming part as an example of the heat-sealing device according to the invention. Moreover, the heat-sealing device according to the invention can be applied to not only the lateral sealed portion forming part but also the vertical sealed portion forming part.

In the vertical type filling-packing machine, an elongated packing film made of a laminate film by laminating a base film layer made from, for example, a biaxially oriented ethylene-vinyl alcohol copolymer resin or the like and a sealant layer made from, for example, a non-oriented ethylene-vinyl acetate copolymer resin or the like is continuously run in its longitudinal direction, during which it is folded in the widthwise direction so as to face the sealant layers to each other and overlapped at both side edge portions, whereby many package bags made of the packing film are formed continuously and a fluid material to be packed such as liquid, viscous or jelly food and drink, seasonings, medicines, cosmetics and others is automatically filled in each of the package bags.

As shown in FIG. 1, the vertical type filling-packing machine mainly comprises a film folded part 1, a vertical sealed portion forming part 2, a feeding part 3 for the packing material, first lateral sealed portion forming part 4*a* and second lateral sealed portion forming part 4*b* as an example of the heat-sealing device according to the invention, and a cutting part 5 for cutting the package bags every single unit or plural units. Each of these parts will be described below.

In the film folded part 1, an elongated packing film 6 continuously fed and run from a film roll R is continuously run from top to bottom, during which the packing film 6 is folded in the widthwise direction so as to face its sealant layers to each other while guiding with two U-shaped and inverse L-shaped guide rods 7. In this figure, both side edge portions located at a left end portion of the packing film 6 are overlapped to each other.

In the vertical sealed portion forming part 2, the both side edge portions overlapped by folding the packing film 6 are continuously heated and pressurized by a pair of vertical sealing rolls 8 in the longitudinal direction of the packing film 6 to form a vertical sealed portion 6*a*, whereby the packing film 6 is shaped into a cylindrical form.

The vertical sealed portion forming part 2 comprises a pair of vertical sealing rolls 8 horizontally extending in parallel to each other, a motor 9 rotating the pair of vertical sealing rolls 8 in a direction opposing to each other at an equal rate through a set of gears (not shown) and a pair of air cylinders 10 arranged in bearings for supporting both end portions of a support shaft of the vertical sealing roll 8 so as to energize the pair of vertical sealing rolls 8 in a direction approaching to each other.

Each of the pair of vertical sealing rolls 8 comprises a circular flange 8*a* on its outer peripheral face and a heater (not shown) heating the circular flange 8*a* in its inside. The both side edge portions of the packing film 6 overlapped by pushing forces of the pair of air cylinders 10 are heated by a heat transmitted from the heater to the circular flange 8*a* while sandwiching between their circular flanges 8*a* under a pressure. Thus, the sealant layers in the both side edge portions of the packing film 6 are fusion-adhered to each other to form a vertical sealed portion 6a, while the packing film 6 is run downward by the rotation of the circular flanges 8a.

In the feeding part for the packing material 3, the packing material M fed from a tank (not shown) through a pump and a feeding path (not shown) is filled into an inside of the cylindrically shaped packing film 6 continuously or intermittently at a predetermined amount by means of a filling nozzle 11 passing between the pair of vertical sealing rolls 8 from top to bottom.

In the first lateral sealed portion forming part 4a, lateral sealed portions 6b are formed intermittently by fusion-adhering the cylindrically shaped packing film 6 at given intervals in the longitudinal direction over its full width through heating and pressing with a pair of lateral sealing rolls 12. Thereafter, the lateral sealed portion 6b is re-pushed by the second lateral sealed portion forming part 4b to ensure the sealing, whereby many package bags W are continuously made at a connected state in the longitudinal direction of the packing film 6. Next, each of the package bag W is obtained by cutting an approximately middle portion of the lateral sealed portion 6b in the continuously packed package bags W with the cutting part 5.

Figure 2:
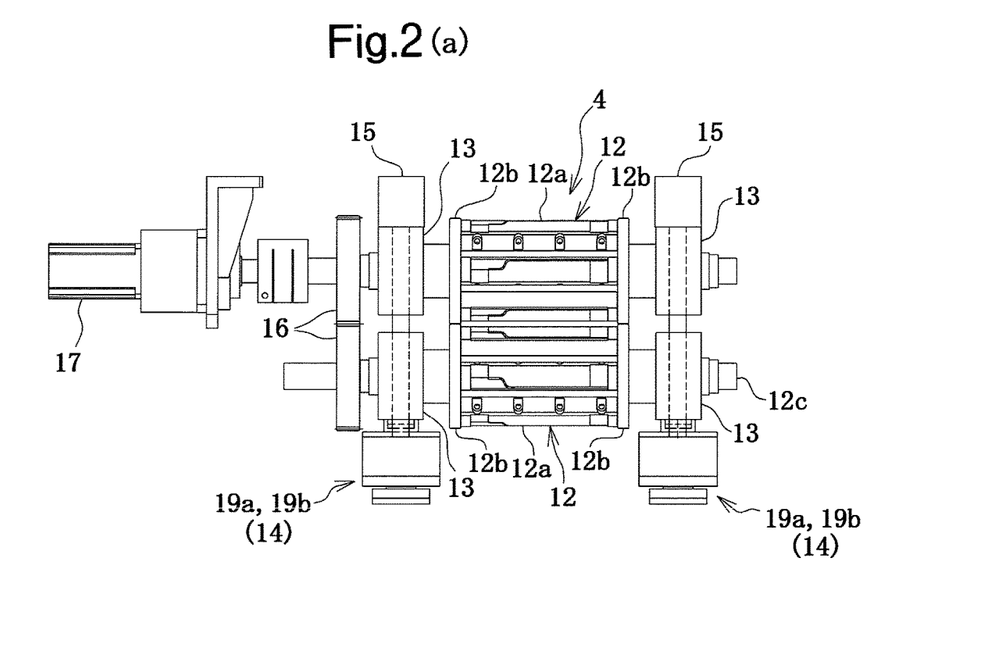

FIGS. 2(a) and (b) are a plan view and a front view illustrating a construction of the first lateral sealed portion forming part 4a. As shown in these figures together with FIG. 1, the lateral sealed portion 6b is formed in the lateral sealed portion forming part 4a by holding the packing film 6 with a plurality of heat sealing bars 12a (6 bars in the figure) located at equal intervals in a circumferential direction and extending in an axial direction on outer peripheral faces of a pair of lateral sealing rolls 12 (shown on only the near side of FIG. 1) rotating in a direction opposing to each other at an equal rate through a set of gears 16 with a motor 17. In the pair of lateral sealing rolls 12 are arranged pushing means 14 comprised of first cylinder 19a and second cylinder 19b adjacent to bearing portions 13 supporting both end portions of a support shaft 12c in the pair of lateral sealing rolls 12 so as to energize the rolls in a direction approaching to each other.

Moreover, the pair of lateral sealing rolls 12 comprise a pair of circular flanges 12b at both end positions of the heat sealing bar 12a and a heater (not shown) for heating the heat sealing bars 12a in their interiors. In the pair of lateral sealing rolls 12, a size of each portion is set so as not to generate a gap between the heat sealing bars 12a opposing to each other in the pair of lateral sealing rolls 12 at a state of contacting the pair of circular flanges 12b with each other.

The lateral sealed portion forming part 4a of the above construction is characterized by comprising a fluid pressure controlling means 24 for preferably adjusting the pushing forces of the first cylinder 19a and second cylinder 19b in the pushing means 14 by a feeding pressure of a pressurized air, and a controlling means 20 as a superior controlling means for calculating a proper pushing force in accordance with a variety of the packing film 6 such as packaging form, film construction and so on and the filling conditions such as feeding rate of the film and so on and controlling the fluid pressure controlling means 24 so that a total value of the pushing forces of the first cylinder 19a and the second cylinder 19b in the pushing means 14 is made to the above proper pushing force.

Figure 3:
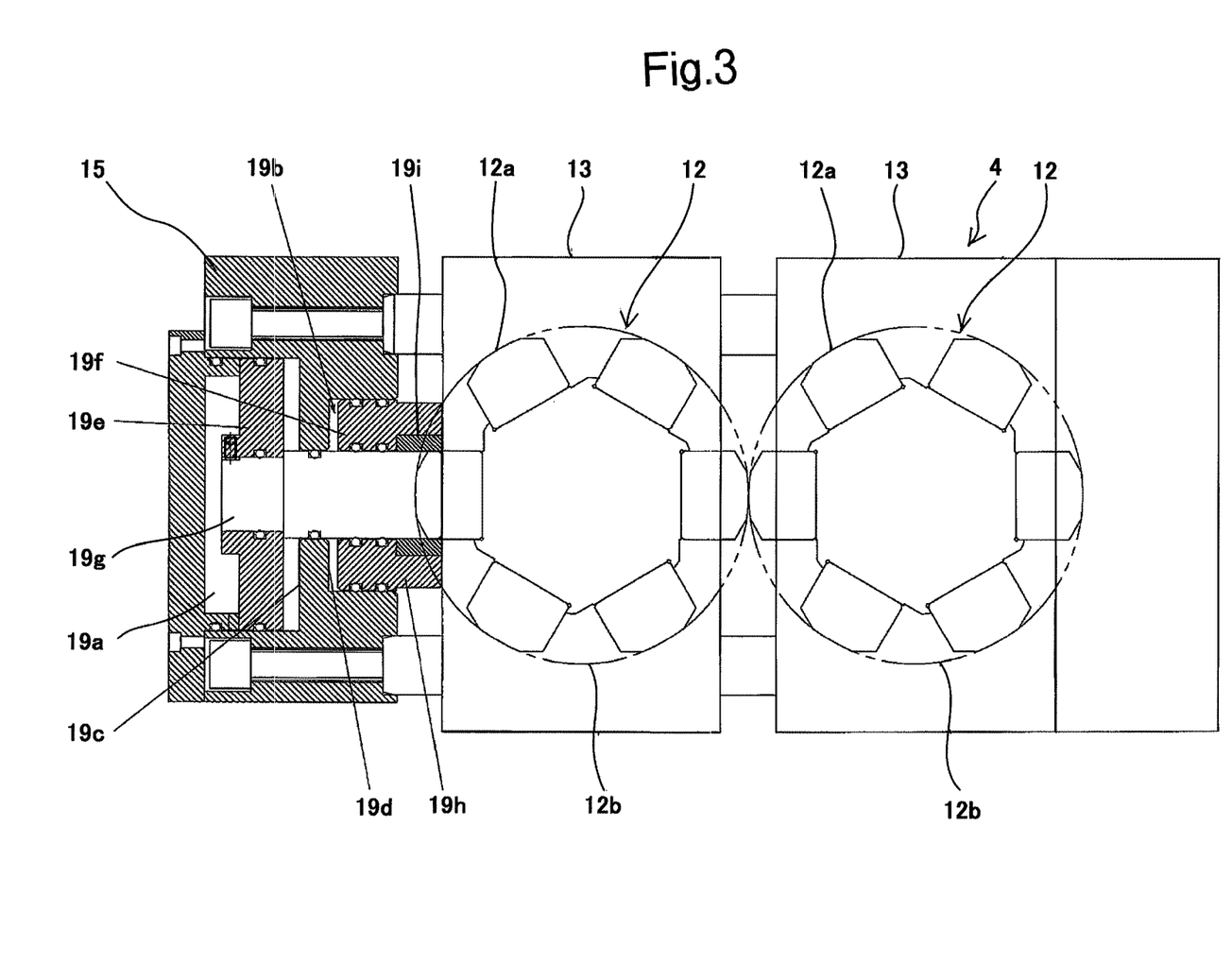
FIG. 3 is an enlarged section view of the lateral sealed portion forming part.

For example, as shown in the section view of FIG. 3, the first cylinder 19a and the second cylinder 19b are formed by using a tip member 15 as a main cylinder material, and inserting a piston 19e for the first cylinder and a piston 19f for the second cylinder airtightly and slidably into an approximately rectangular cylindrical concave portion 19c for the first cylinder formed in the tip member 15 in a direction opposite to the bearing 13 and a cylindrical concave portion 19d formed in the tip member 15 toward the bearing 13 through seal rings, respectively. In the tip member 15 are formed fluid paths (not shown) for feeding a working fluid, preferably a pressurized air to the concave portion 19c for the first cylinder and the concave portion 19d for the second cylinder. Moreover, the pressurized air is preferable as a working fluid for the first cylinder 19a and the second cylinder 19b, but a pressurized working liquid such as a working oil or the like may be used for at least one of the cylinders.

Also, pressure-receiving areas of the piston 19e for the first cylinder and the piston 19f for the second cylinder or sectional areas of their sections perpendicular to the sliding direction may be same or different. Preferably, the pressure receiving area of one cylinder is made to 0.6-2.0 times of the pressure receiving area of the other cylinder. Accordingly, even if the fluid (pressurized air or the like) is fed under the same pressure, the pushing forces of the piston 19e for the first cylinder and the piston 19f for the second cylinder may be made different, respectively. To this end, the controlling breath of the pushing force becomes wider. For example, when the pressure receiving area of the piston 19f for the second cylinder is made larger than that of the piston 19e for the first cylinder, even if the filling-packing machine is operated at a high speed as mentioned later, a large pushing force can be generated by the second cylinder 19b, whereby heat sealing followed to the operating speed can be performed efficiently.

A piston rod 19g for the first cylinder is fitted and fixed to the piston 19e for the first cylinder, and a piston rod 19h for the second cylinder is integrally united to the piston 19f for the second cylinder. The piston rod 19g for the first cylinder is inserted into a through-hole formed in the center of the piston rod 19h for the second cylinder and slidably supported by a low-friction bush 19i disposed in the through-hole, whereby the first cylinder 19a and the second cylinder 19b are tandem-arranged on the same axial line, so that they can be constructed very compact.

Figure 4:
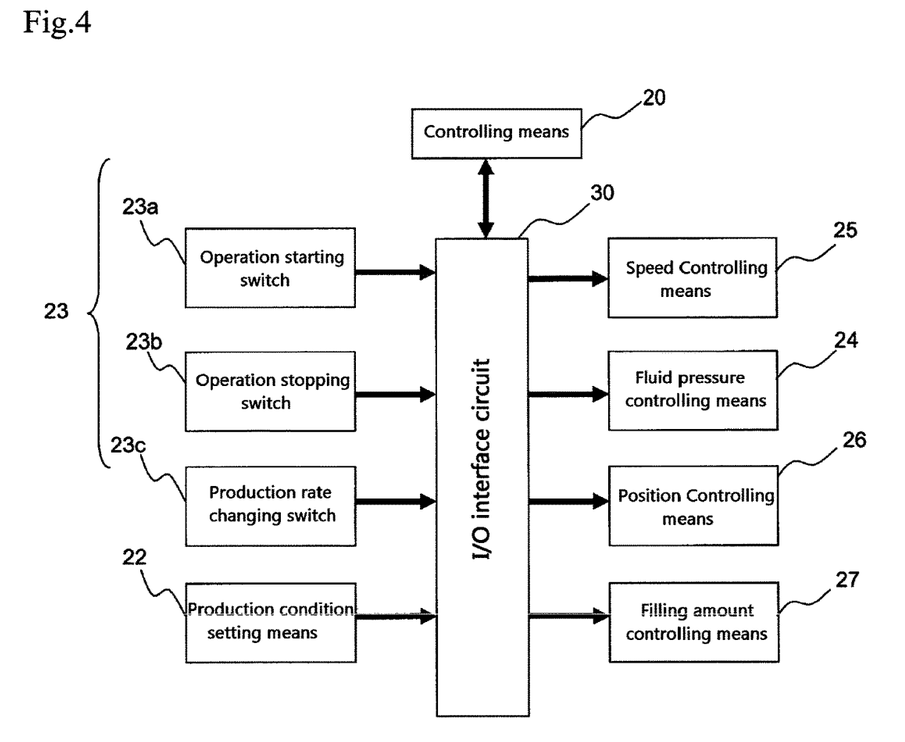
FIG. 4 is a control block diagram of the filling-packing machine in the above example.

The controlling means 20 is made of, for example, a microcomputer performing a predetermined arithmetic processing based on a variety of the packing film 6 such as packaging form, film construction and so on input by a production condition setting means 22 as mentioned later in detail and an input value of the filling conditions such as feeding rate of the film and so on to calculate a proper pushing force of the heat sealing roll 12 and further controls the following fluid pressure controlling means 24 to perform the control of the pushing force by the heat sealing roll 12. The controlling means 20 comprises ROM storing a program for arithmetic processing and a program for controlling the pushing force, RAM temporarily storing results of the arithmetic processing and so on.

As a control block of a main part is shown in FIG. 4, an electrical construction of the main part is provided with a controlling means 20, a production condition setting means 22 (means for inputting set values), an operation means 23, a fluid pressure controlling means 24, a speed controlling means 25, a position controlling means 26, and a filling amount controlling means 27 and further comprises an input-output (I/O) interface circuit 30 for electrically connecting the controlling means 20 to the production condition setting means 22, operation means 23, fluid pressure controlling means 24, speed controlling means 25, position controlling means 26 and filling amount controlling means 27.

Thus, the controlling means 20 controls the fluid pressure controlling means 24 as mentioned above, and has a function of adjusting a heat sealing position, a cutting position, a filling amount of the packing material and so on by performing a given arithmetic processing based on the input values of the production condition setting means 22 to control a motor for the heat sealing roll 12 of the speed controlling means 25, a motor for the cutting part 5 of the position controlling means 26, a feeding pump for the packing material in the filling amount controlling means 27 and so on. Moreover, the controlling means 20 may be concurrently worked by a controlling means functioning as a main computer of the filling-packing machine.

The production condition setting means 22 is constructed from a touch panel integrally united, for example, with an input means such as ten key or the like and a monitor displaying set values by the input means and can set or change the variety of the packing film 6 such as packaging form (length of package bag W (seal pitch)), film construction and so on and the filling conditions such as feeding rate of the film and so on.

Also, the production condition setting means 22 comprises a memory means such as backup RAM, EEPROM or the like for storing production conditions in accordance with the variety of the packing film 6 and the filling conditions.

The operation means 23 comprises an operation starting switch 23*a* operating the filling-packing machine, an operation stopping switch 23*b* stopping the filling-packing machine and a production rate changing switch 23*c*, which are constructed by a dedicated push button switch, a dedicated touch switch attached to the touch panel constituting the production condition setting means 22 or the like.

Also, the fluid pressure controlling means 24 is preferable to be made of first and second electropneumatic regulators and electrically performs the switching operation of a flow valve based on a control signal output from the controlling means 20. Thus, a pressurized air based on the pushing force set by the production condition setting means 22 is fed to the pushing means 14 made of the first cylinder 19*a* and the second cylinder 19*b*, whereby the one heat sealing roll 12 is moved to the other heat sealing roll 12 and the packing film 6 is held with the pair of heat sealing bars 12*a* disposed in the heat sealing roll 12.

The pressurized air is fed from the first and second electropneumatic regulators so as to render the total value of pushing forces of the first cylinder 19*a* and the second cylinder 19*b* into the proper pushing force calculated by the controlling means 20 based on the production condition setting means 22. Each pushing force from the first cylinder 19*a* and the second cylinder 19*b* is determined as follows.

Figure 5:
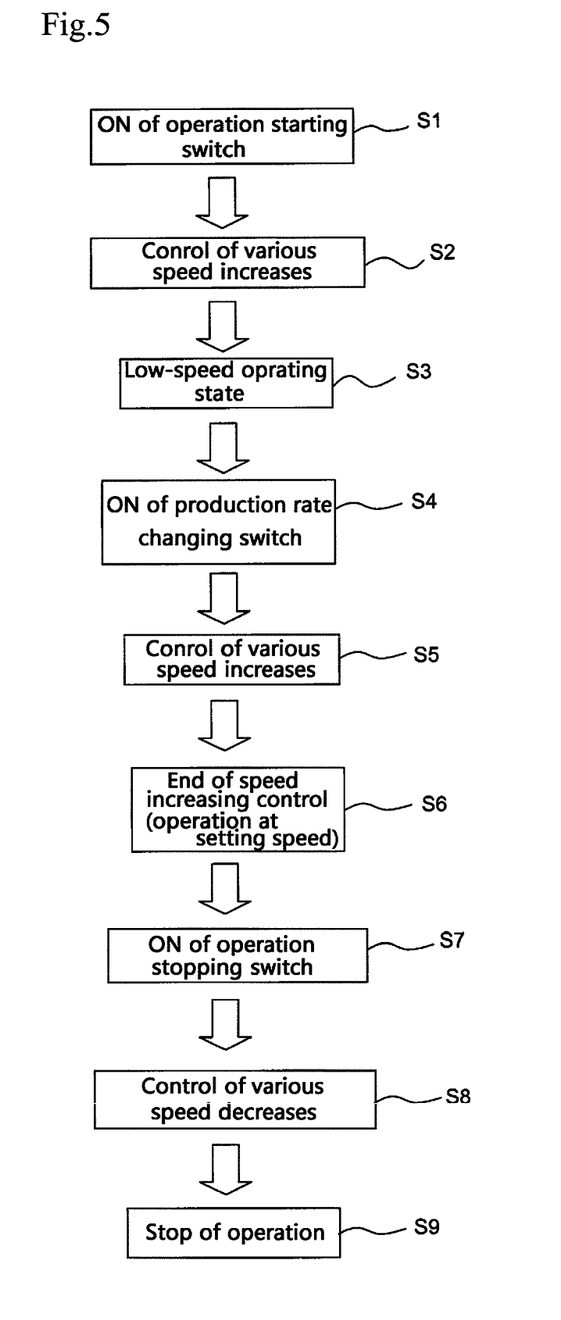
FIG. 5 is a flow chart showing a control example of a controlling means.
Figure 6A:
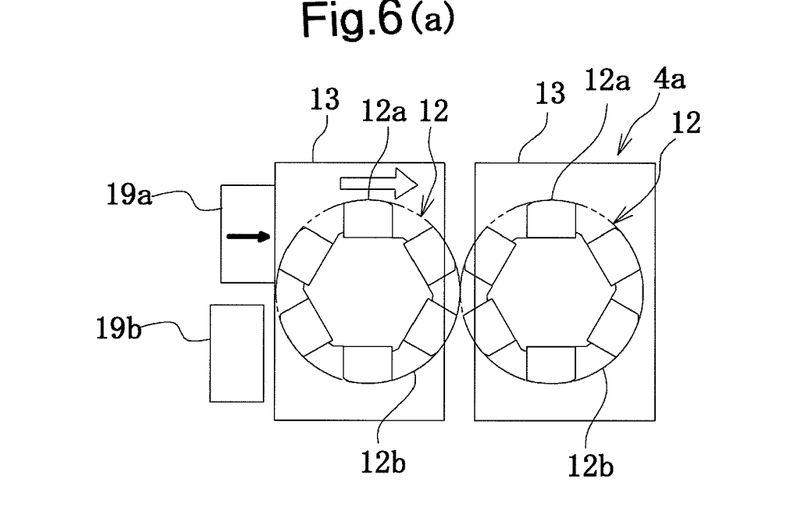

As shown as a flow chart in FIG. 5, inputting of an input signal for starting the operation of the filling-packing machine is first confirmed in the controlling means 20 by switch-on of an operation staring switch 23*a* at a step S1. In a step S2, the rotation of a driving motor for a speed controlling means 25 is controlled so as to arrive the feeding rate of the packing film 6 at a predetermined low-speed operating rate set by the input of the production condition setting means 22, while the pressurized air is fed from the first electropneumatic regulator of the fluid pressure controlling means 24 to the first cylinder 19*a* so as to make the pushing force of the heat sealing roll 12 to the proper pushing force calculated based on the feeding rate of the packing film 6 by the controlling means 20. As shown in FIG. 6(*a*), a treatment for gradually (stepwise) increasing the pushing force of the first cylinder 19*a* is performed to attain a low-speed operating state at a step S3.

Figure 6B:
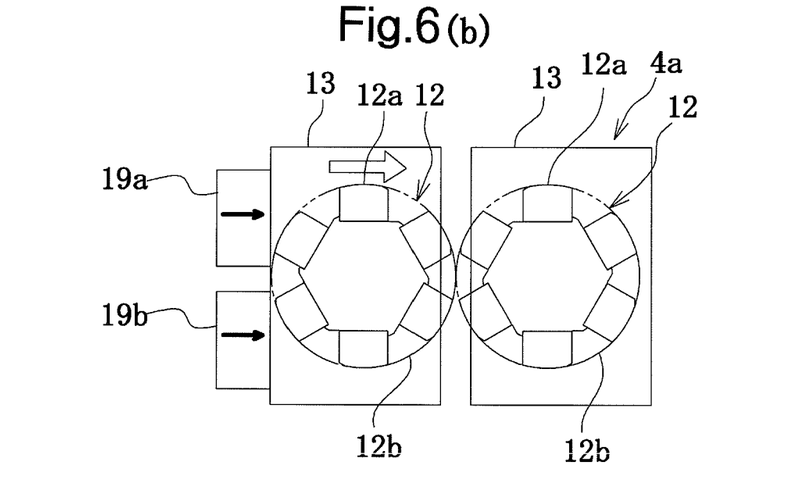

When a production rate changing switch 23*c* of the filling-packing machine is switched-on in a step S4, an input signal is confirmed by the controlling means 20, whereby the rotation of a driving motor for the speed controlling means 25 is controlled in a step S5 so as to make the feeding rate of the packing film 6 to a production rate set by the production condition setting means 22 likewise the above. At the same time, a treatment for feeding the pressurized air from the first electropneumatic regulator of the fluid pressure controlling means 24 to the first cylinder 19*a* to gradually (stepwise) increase the pushing force is performed so as to make the pushing force of the heat sealing roll 12 to the proper pushing force calculated by the controlling means 20. If the maximum pushing force by the first cylinder 19*a* does not satisfy the required pushing force, as shown in FIG. 6(*b*), the feeding of the pressurized air from the second electropneumatic regulator to the second cylinder 19*b* is started in addition to the pushing by the first cylinder 19*a*. Thus, a treatment for gradually (stepwise) increasing the pushing force is performed so as to render the total value of the pushing forces of the first cylinder 19*a* and the second cylinder 19*b* into the proper pushing force calculated by the controlling means 20, whereby a state of operating at a setting speed is attained in a step S6.

In case of stopping the operation of the filling-packing machine, an action opposite to the above speed increasing control is conducted. That is, when an operation stopping switch 23*b* is switched-on in a step S7, an input signal is confirmed by the controlling means 20, whereby the rotating of a driving motor for the speed controlling means 25 is controlled so as to render the feeding rate of the packing film 6 into zero in a step S8. At the same time, the amount of the pressurized air fed from the second electropneumatic regulator of the fluid pressure controlling means 24 to the second cylinder 19*b* is first decreased and thereafter the amount of the pressurized air from the first electropneumatic regulator to the first cylinder 19*a* is decreased, whereby a treatment for gradually (stepwise) decreasing the pushing force of the heat sealing roll 12 is performed to attain a state of stopping the operation in a step S9.

The pushing means 14 for pushing the bearings 13 in the pair of heat sealing rolls 12, which are arranged in parallel and rotary-driven in opposite directions to each other, in a direction approaching to each other is constructed with two cylinders of the first cylinder 19*a* and the second cylinder 19*b*, wherein the total value of the pushing forces of the cylinders 19*a*, 19*b* is made to the proper pushing force calculated in accordance with a variety of the packing film 6 such as packaging form, film construction and so on and the filling conditions such as feeding rate of the film and so on. Thus, an acceptable range in the change of the pushing force can be made large. For example, in order to adjust the misalignment of the packing film 6 or the filling amount of the packing material, it is made possible to adjust the each pushing force of the first cylinder 19*a* and the second cylinder 19*b* followed to the operating rate even if the feeding rate of the packing film 6 is low or even if the high-speed operation is performed for increasing the productivity. Therefore, the heat sealing can be always performed surely and non-defective products can be produced from the start of the production to the end thereof, and further there can be expected an effect of causing no voluminous loss of the packing film material or the packing material.

According to this embodiment, the driving of not only the fluid pressure controlling means 24 but also the motor for the cutting part 5 in the position controlling means 26, pump for feeding the packing material in the filling amount controlling means 27 and so on is controlled followed to the feeding rate of the packing film 6 even in either start and end of the operation, so that the heat-sealing position and cutting position of the package bag, the filling amount of the packing material and so on are properly adjusted from the start of the operation to the end thereof, whereby non-defective package bags W can be produced to the last without wasting the packing film 6 and the packing material.

In this embodiment, each pushing force of the heat sealing rolls 12 is controlled by the first and second electropneumatic regulators, but the each pushing force may also be controlled by the single electropneumatic regulator.

Although the above is explained with respect to the manufacture of the three-way sealed type package bags W as a typical example, the heat-sealing device according to the invention can be preferably applied to not only the vertical seal forming part and lateral seal forming part in the manufacture of four-sides sealed type package bags W but also the vertical seal forming part and lateral seal forming part in a multiple-row filling-packing machine.

DESCRIPTION OF REFERENCE SYMBOLS

1 film folded part, 2 vertical sealed portion forming part, 3 feeding part of material to be packed, 4a first lateral sealed portion forming part, 4b second lateral sealed portion forming part, 5 cutting part, 6 packing film, 7 guide rod, 8 vertical sealing roll, 8a circular flange, 9 motor, 10 air cylinder, 11 filling nozzle, 12 heat sealing roll, 12a heat sealing bar, 12b circular flange, 13 bearing, 14 pushing means, 15 tip member, 16 gear set, 17 motor, 19a first cylinder, 19b second cylinder, 19c concave portion of first cylinder, 19d concave portion of second cylinder, 19e piston for first cylinder, 19f piston for second cylinder, 19g piston rod for first cylinder, 19h piston rod for second cylinder, 19i low-friction bush, 20 controlling means, 22 production condition setting means, 23 operating means, 23a operation starting switch, 23b operation stopping switch, 23c production rate changing switch, 24 fluid pressure controlling means, 25 speed controlling means, 26 position controlling means, 27 filling amount controlling means, 30 input-output (I/O) interface circuit, R film roll, W package bag

The invention claimed is:

1. A heat-sealing device for holding an elongated packing film fed in a longitudinal direction and arranged at an opposing state of adhesive layers or sealant layers with a pair of heat-sealing rolls disposed in parallel to each other and extending in a first axial direction to form a heat-sealed portion, comprising:
    a pusher made of a first cylinder and a second cylinder arranged on a same axial line to hold the packing film with the heat-sealing rolls by pushing at least one of the heat-sealing rolls to the other heat-sealing roll through an action of fluid pressure, the same axial line of the first cylinder and the second cylinder extending in a second axial direction perpendicular to the first axial direction of the heat-sealing rolls,
    a fluid pressure controller configured to adjust the fluid pressure of the pusher, and
    a superior controller configured to calculate a calculated pushing force from input values of a variety of the packing film and filling condition and to control the fluid pressure controller so that a total value of pushing forces of the first cylinder and second cylinder is made equal to the calculated pushing force and one or both of the first cylinder and the second cylinder are operated in response to a change in a feeding rate of the packing film.

2. The heat-sealing device according to claim 1, wherein the superior controller operates only the first cylinder when the feeding rate of the packing film is not more than a predetermined rate and controls the fluid pressure controller so as to offset a shortage of the pushing force of the first cylinder with the pushing force of the second cylinder when the feeding rate of the packing film exceeds the predetermined rate.

3. A filling-packing machine comprising:
    a vertical sealer to form a vertical sealed portion continuously extended in a longitudinal direction of one or two elongated packing films at a side edge portion of the packing film continuously or intermittently fed in the longitudinal direction and arranged at an opposing state of adhesive layers or sealant layers to render the packing film into a cylindrical form, and
    a lateral sealer to form lateral sealed portions, which are extended in a direction perpendicular to the longitudinal direction of the packing film over a full width of the packing film to seal a packing material intermittently or continuously filled in the cylindrical packing film provided with the vertical sealed portion, at intervals in the longitudinal direction of the packing film,
    wherein the vertical sealer and/or the lateral sealer are provided with a heat-sealing device as claimed in claim 2.

4. A filling-packing machine comprising:
    a vertical sealer to form a vertical sealed portion continuously extended in a longitudinal direction of one or two elongated packing films at a side edge portion of the packing film continuously or intermittently fed in the longitudinal direction and arranged at an opposing state of adhesive layers or sealant layers to render the packing film into a cylindrical form, and
    a lateral sealer to form lateral sealed portions, which are extended in a direction perpendicular to the longitudinal direction of the packing film over a full width of the packing film to seal a packing material intermittently or continuously filled in the cylindrical packing film provided with the vertical sealed portion, at intervals in the longitudinal direction of the packing film,
    wherein the vertical sealer and/or the lateral sealer are provided with a heat-sealing device as claimed in claim 1.

* * * * *